May 16, 1939.  A. KÉGRESSE  2,158,457
VEHICLE FOR MIXED PROPULSION BY WHEELS AND ENDLESS TRACKS
Filed May 27, 1937   2 Sheets-Sheet 1
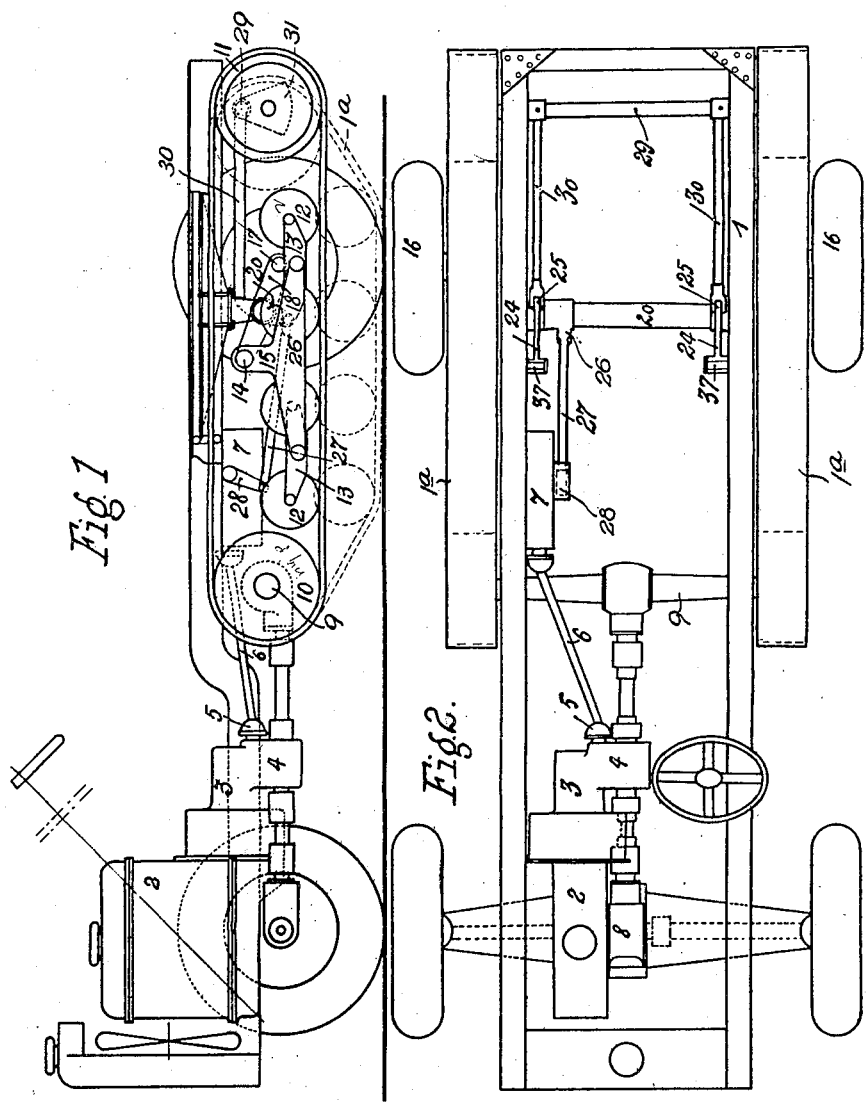
INVENTOR
ADOLPHE KÉGRESSE
BY
Young, Emery & Thompson
ATTORNEYS

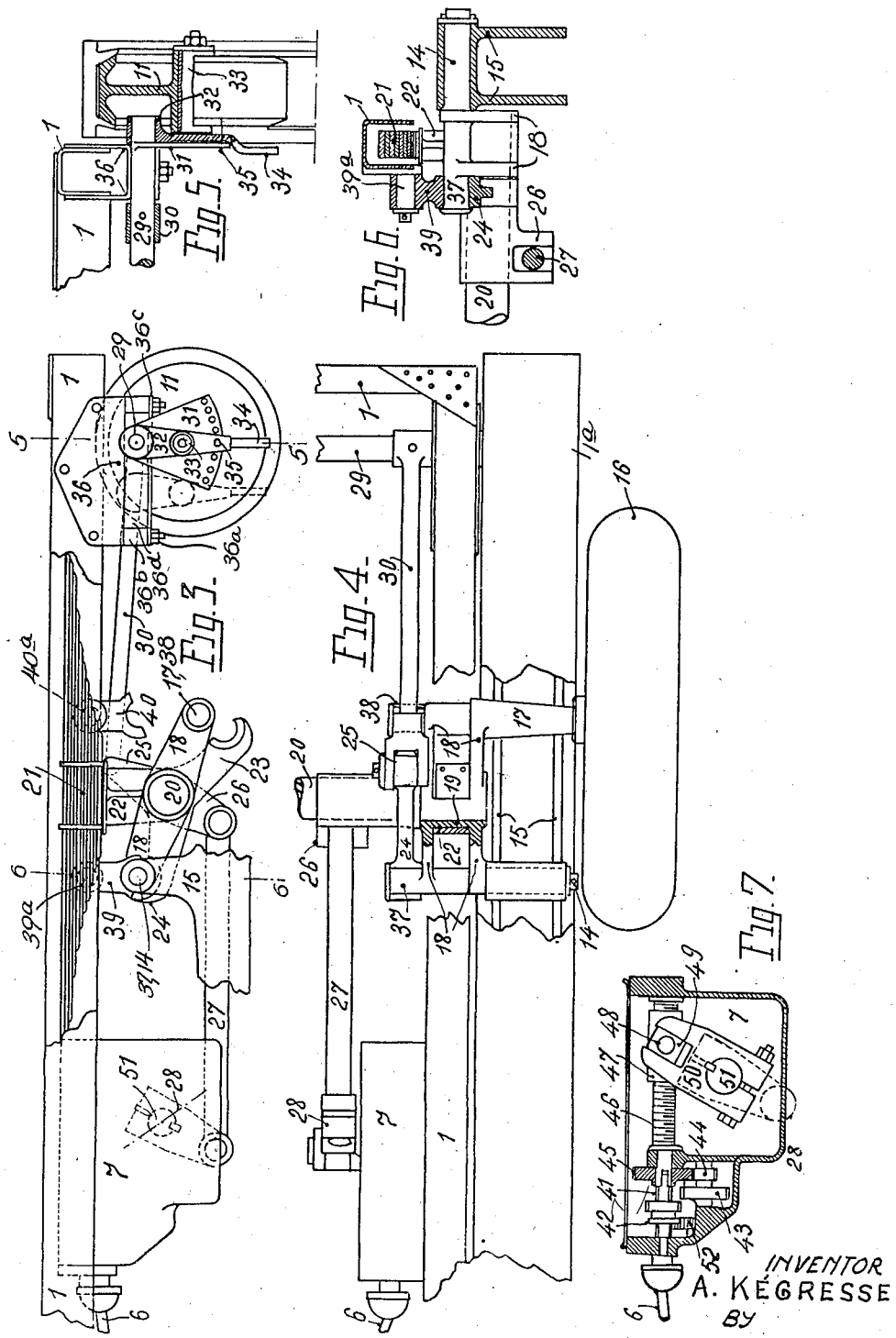

Patented May 16, 1939

2,158,457

UNITED STATES PATENT OFFICE 2,158,457

VEHICLE FOR MIXED PROPULSION BY WHEELS AND ENDLESS TRACKS

Adolphe Kégresse, Paris, France

Application May 27, 1937, Serial No. 145,140
In France June 2, 1936

10 Claims. (Cl. 180—9.1)

The endeavour to increase the output of vehicles called upon to move both over rough ground as also upon roads has led the inventors to design machines for combined propulsion by wheels and endless tracks.

Hitherto the devices carried out consisted either in adding a train of endless tracks to the rear motive wheels, retaining the front directing wheels, or in substituting for the four wheels of the vehicle a complete train of endless tracks, thus transforming a vehicle simply with wheels into a vehicle simply with endless tracks.

If the first of these solutions is satisfactory for running on roads it is not completely so for rough ground where it does not ensure full adhesion.

The second solution gives a vehicle with complete adhesion on rough ground but for running on roads it is handicapped with respect to the foregoing system by the fact of its greater weight. Furthermore, it presents the very grave inconvenience of being of greater complexity and of a prohibitive cost price.

In the known systems of first category, makers have been content to substitute or add a train of endless tracks for the motive wheels of an automobile, the front wheels simply ensuring the steering. There is thus obtained a vehicle of the type known by the name "auto-endless track", with partial adhesion.

Departing from this idea, the present invention relates to a vehicle which, like the preceding one is for part propulsion on roads, where it is recognized as sufficiently good, but for total propulsion for rough ground.

To this end and contrary to what has been hitherto effective the propulsion on the road is effected by the front wheels, the rear wheels being simply carriers; on rough ground the propulsive apparatus is constituted by the front wheels and rear endless tracks, thus giving a vehicle with complete adhesion.

A special mechanism permits of raising the rear carrier wheels, thus counteracting their effect and replacing them automatically by motive endless tracks, the propulsion by the front wheels still persisting, so that for running on rough ground there is obtained a vehicle with total propulsion.

In addition to this fundamental characteristic the invention comprises novel designs of important details such as mechanism for the distribution of the load over the rear wheels and the motive endless tracks by means of a single axle connected elastically to the chassis; independence of the rear wheels as also of the trains of endless tracks; control of the raising of the carrier train, in combination with the loose pulleys so as to increase the distance between the axles of the wheels carrying the endless band, thus raising from the ground the lower loop of the band when running on roads and this without increasing the space taken up in height.

The drawings show an example of carrying out the invention.

In these drawings:

Figure 1 is a view in elevation, the frame being partially removed for the clearness of the drawing.

Figure 2 is a plan view of the machine.

Figure 3 shows, on a larger scale and in elevation, the design of the single carrier axle and its connection on the one hand with the chassis and the mechanism for controlling the lifting, and the other hand with the loose pulleys of the endless track.

Figure 4 shows the same device seen in plan and in partial section.

Figure 5 is a partial section on the line 5—5 of Figure 3.

Figure 6 is a section on the line 6—6 of Figure 3.

Figure 7 shows in section a mechanism for the control of the lifting.

As shown by Figures 1 and 2 if the train of endless tracks 1a is removed there is left an ordinary automobile chassis with front drive. This machine comprises a chassis 1 of a form suitable to the requirements. The motor 2 transmits its power to the special change-speed gear-box 3 provided with a reducing gear represented by its casing 4 which, when the coupling of the endless track motor axle occurs, provides for the reduction of speed necessary for the front driving wheels for running on rough ground.

The change-speed gear-box 3 comprises furthermore a driving member 5 (Figures 1 and 2) serving to control, by means of a shaft 6, the lifting mechanism indicated diagrammatically at 7 on Figures 1, 2, 3 and 4 and the section of which is shown by Figure 7.

The speed reducer drives, either directly at a high speed, the differential 8 of the front driving axle, or, through the intermediary of a suitable train of reducing gears, the differential 8 and the motive axle 9 of the endless track.

The endless track train is of usual type. It has a driving pulley 10, a loose pulley 11 and a set of rollers 12—four rollers in the example shown—connected in pairs by equalizer levers 13 which levers are pivotally connected to the ends of a main equalizer lever 15 which is carried by the endless track supporting journal 14.

The rear wheels 16 are idle and are freely mounted on a journal 17.

It has been seen that these wheels 16 are only carrier wheels when on the road; on rough ground they are lifted and have no longer any action on the running of the vehicle.

The two journals 14 and 17 (endless track journal and wheel journal) are integral with a common part or rocking lever 18 the hub 19 of which (Figure 4) is freely mounted on a carrier axle 20. This axle 20 is connected to the chassis 1 through the intermediary of two leaf springs 21 arranged at each of its extremities. These springs are mounted on the axle 20 by means of the supporting parts 22, the head of which is adjusted with slight friction on the hub 19 of the rocking lever 18.

The carrier axle 20 furthermore has permanently locked thereon and close to each of its extremities, a three-branch lever 23, 24, 25 (Figures 3 and 4) and at one of its extremities only, a lever 26 (Figures 3 and 4) also integral with the said axle. The lever 26 is actuated by a connecting rod 27 the other extremity of which is mounted on a lever 28 forming part of the lifting mechanism represented diagrammatically on Figure 7.

The arm 25 of each of the three branch levers 23, 24, 25 is connected to a sliding axle 29 by means of a connecting rod 30 fixed on the axle 29. This axle 29 has close to one of its extremities a plate sector 31 (Figures 3 and 5) provided with holes along its curved edge. The axle 29 has a lever 32 (Figs. 3 and 5) mounted loosely on each end thereof. Each lever 32 carries a journal 33 serving as an axle for the corresponding rear idle pulley of the endless track. Rigidly fixed to each end of the axle 29 is a sector plate 31 provided with a plurality of holes 31a. The lower end of the lever 32 terminates in a handle 34 which serves as a means for shifting said lever 32 over said sector plate. The lever 32 is provided with a hole 35 adjacent the handle thereof adapted to register with the series of holes 31a in the sector plate. After the lever 32 is shifted to a desired position, a bolt (not shown) is passed through hole 35 and a registering hole 31a to securely lock the lever 32 to said sector plate. It will be realized that as the lever 32 is displaced over the sector plate, the relative distance between the fixed pulley and the idle pulley carried on the journal 33 will be varied. The axle 29 is supported at each extremity by a part 36 secured to frame 1 and provided with downwardly extending bolts 36a on which are positioned spacers 36b for spacing a guide bar 36c from the part 36. The space between parts 36 and 36c serves as a straight slide 36d in which the axle 29 can slide.

Each journal 14 of the carrier trains is extended on the inner side by an integral trunnion 37 connected to or forming part of the rocking lever 18 (Figures 2, 4 and 6). The journal 17 of each wheel is also extended by a similar trunnion 38, also connected and forming part of the rocking lever 18 (Figure 4).

The trunnion 37 is intended to be supported in a part 39, hinged at 39a on the chassis (Figures 3 and 6), and the trunnion 38 can be supported by a similar part 40, also hinged at 40a to the chassis in order to allow oscillation of the trunnions 37, 38 in the bearings formed between the lower end of member 39 and the end of lever 24 for trunnion 37 and formed between the lower end of member 40 and the end of lever 23 for trunnion 38.

The lifting system represented in section on Figure 7, receives its movement from the change-speed gear-box through the intermediary of the shaft 6, which drives a splined shaft 41, the latter carries a runner 42 which can engage with the pinion 43 itself integral with another pinion 44 which engages with a wheel 45, fixed on a screw 46 of suitable pitch. A nut 47 is threadedly mounted on screw 46 and is adapted to be shifted by said screw axially of the latter. Two stub shafts 48 extend from opposite sides of the nut 47 and loosely carry blocks 49 which are slidably positioned between the bifurcations of the end of lever 50 which is fixed to the shaft 51 for rocking the latter. Lever 28 is also fixed to shaft 51 and serves to transmit motion from shaft 51 to the link 27.

The sliding collar 42 can be placed in engagement with another pinion 52 which also controls the pinion 43.

It is seen that according to the position of the sliding collar 42, either on the wheel 43 or on the wheel 52 there will be obtained the rotation of the screw 46 in the two directions, thus giving as desired a reciprocating movement to the levers 50 and 28 keyed on the same axle and, through the intermediary of the connecting rod 27, with the lever 26. The latter by its movement will actuate the three-branch lever 23, 24, 25 integral like itself with the axle 20.

Figures 3, 4 and 6 represent the mechanism of the carrier axle 20 and of the journals of the wheels and endless track, the machine resting on its wheels. The trunnion 37 of the journal 14 bears in the hinged part 39, in which it is maintained by arm 24 of the three-branch lever 23, 24, 25.

In this position the weight of the vehicle will be transmitted to the wheels 16 through the intermediation of the suspension springs 21, the support 22, the axle 20, the rocking lever 18 and finally the wheel journal 17. The rod 30 connecting the arm 25 with the axle 29 will have displaced the sliding axle 29 of the idle endless track pulleys to the right, to bring it into the end position corresponding to the raising of the endless tracks, shown in full lines on Figures 1, 2 and 3.

If now the lifting system 7 is operated to bring the lever 28 into its opposite position, the lever 26 being fixed to axle 20 will rock said shaft and the three-branch lever 23, 24, 25 also being fixed to axle 20 will oscillate with said axle 20, disengaging the arm 24 from the trunnion 37.

On assuming the extreme position, opposite to that of Figures 1, 2 and 3 the three-branch lever will be rocked in a counterclockwise direction from the position shown in said figures and the arm 23 thereof will raise the trunnion 38 of the journal 17 of wheel 16 to set it on the hinged part 40. The arm 25, through the intermediary of the connecting rod 30, will move the axle 29 supporting the idle pulley, with which it is integral, to the left, thus loosening the endless track 1a so that the carrier train can be lowered by displacement of the three-branch lever to assume the position shown dotted on the Figure 1, which is the normal position of running when driven by the endless track.

As will be seen, the wheel 16 will thus be raised, interfering in no way with the operation of the endless band drive.

Through an appropriate linkage, the speed reducer 4 is set in action when the vehicle 7 is to be driven by endless tracks and brings about a suitable reduction in speed of the front wheels. The propulsion of the machine will thus be complete, by wheels in front and by endless track at the rear.

If necessary it would be easy to take off the wheels 16, to obtain a vehicle of the auto-endless track type, but with total adhesion.

The regulation of the tension of the endless band will be ensured, independently of the sliding of the axis 29 by the rearward oscillation about the axis 29 of the journal 33 integral with the part 32. A simple bolt, introduced into the hole 35 will permit of fixing the part 32 at the desired position to obtain the tension which is suitable of the endless band. The handle 34 will serve to facilitate the manipulation of this tension.

It will be noted that the replacement, at the rear of the vehicle, of the idle carrier wheels, by the train of driving endless tracks, modifies the distribution of the load in the sense desired, that is to say, that it is greater on the train of endless tracks than on the carrier wheels. This variation of the load will be all the greater the longer are the arms of the rocking lever 18 (Figures 1, 3 and 4). These arms represented approximately equal on the figures may naturally be of different lengths according to the uses intended.

Furthermore, the particular mounting described of the journals of the train of endless track carrier system and of the journals of the rear carrier wheels, integral with a rocking lever hinged on a single axle, connected elastically to the chassis, reduces the vertical stroke of this axle with respect to that of the system in operation, whence reduction of the oscillations of the elastic system in a direct ratio with the length of the lever arm of the oscillatory rocking lever, both for the train of wheels as also for the endless track train.

Furthermore, the mounting described ensures the independence of the carrier wheels when the stoppage of the vehicle is on its wheels and the independence of the carrier trains of the endless track system when this is operating. This independence is obtained by the free oscillation of each of the rocking levers 18 which carry journals, on the axle 20, whatever may be the system in contact with the ground.

The important advantage presented by the mounting of one of the carrier pulleys of the endless band on an axle sliding automatically with the lifting system is in the fact that it is only the lower loop of the endless band which is raised for running on roads, thus limiting the space taken up in height and which is very troublesome for designing the carriage work of any kind with which this class of vehicle is equipped. It is known in fact that similar machines in which it is the whole endless track train which lifts, or at least the two lower and upper loops, of the endless track which are shifted in height, increasing by so much in this direction the waste space.

It is quite evident that the system described, here applied to the idle pulleys carrying the endless band could equally well apply to the driving pulleys. It would in this case be sufficient to make the driving axle either sliding, or oscillating or to connect it either directly to the lifting system or to an axis or idle controlled thereby.

It would also be possible by making use of the invention to act at the same time on the two pulleys, the driving and the idle ones, supporting the endless band. It would be sufficient for this purpose to make the axles of these two pulleys to slide and to connect them by connecting rods to a rotating axis controlled by the lifting system.

These embodiments are within the reach of any expert knowing the invention described.

It will be also noted that the regulation of the tension of each endless band is ensured independently of the sliding of the axis 29 connecting the two idle pulleys, by a simple manipulation, which consists in shifting a bolt in holes, acting, to effect this, on a handle which may be extended by means of a simple tube forming a lever.

I claim:

1. A high speed front wheel steered vehicle adapted to be driven by ground wheels and endless tracks, comprising a chassis, a pair of front steering and driving ground wheels always in steering and driving contact with the ground, an oscillating suspended rear axle, levers mounted on said rear axle having arms extending forwardly and rearwardly from said rear axle, journals mounted at the ends of said levers, rear ground-engaging wheels carried by the journals at one end of said levers, and endless track-engaging roller bogies carried by the journals at the other end of said levers.

2. In a high speed vehicle adapted to be driven by ground wheels and endless tracks, a chassis, a pair of front steering and driving ground wheels, an endless track on each side of the chassis, front and rear pulleys supporting said track, said pulleys being fixed against vertical movement, an oscillating suspended rear axle located between the axes of said front and rear pulleys, levers mounted on said rear axle having arms extending forwardly and rearwardly from said rear axle, journals mounted at the ends of said levers, rear ground-engaging wheels carried by the journals at one end of said levers, and endless track-engaging roller bogies carried by the journals at the other end of said levers and positioned between said front and rear pulleys.

3. In a high speed vehicle adapted to be driven by ground wheels and endless tracks, a chassis, a pair of front steering and driving ground wheels, an oscillating suspended rear axle, an endless track on each side of the chassis, front and rear pulleys supporting said track, said pulleys being fixed against vertical movement, levers mounted on said rear axle having arms extending forwardly and rearwardly from said rear axle, journals mounted at the ends of said levers, rear ground-engaging wheels carried by the journals at one end of said levers, endless track-engaging roller bogies carried by the journals at the other end of said levers, a driving motor, and a transmission for driving the front wheels of the vehicle and one pulley of each endless track.

4. In a high speed vehicle adapted to be driven by ground wheels and endless tracks, a chassis, a pair of front steering and driving ground wheels, an oscillating suspended rear axle, an endless track on each side of the chassis, front and rear pulleys supporting said track, said pulleys being fixed against vertical movement, levers mounted on said rear axle having arms extending forwardly and rearwardly from said rear axle, journals mounted at the ends of said levers, rear ground-engaging wheels carried by the journals at one end of said levers, endless track-engaging roller bogies carried by the journals at the other end of said levers, a driving motor, and a transmission for driving the front wheels of the vehicle and the one pulley of each endless track, said transmission comprising means for disconnecting the drive to said endless track pulleys.

5. In a high speed vehicle adapted to be driven by ground wheels and endless tracks, a chassis, a pair of front steering and driving ground wheels, an oscillating suspended rear axle, levers mounted on said rear axle having arms extending forwardly and rearwardly from said rear axle, journals mounted at the ends of said levers, rear ground-engaging wheels carried by the journals at one end of said levers, endless track-engaging roller bogies carried by the journals at the other end of said levers, a second double-armed lever mounted on said axle adjacent each end thereof, an upwardly opening semi-bearing carried at each end of the arms of said second levers, and downwardly opening semi-bearings carried by the chassis adjacent the rear thereof and positioned to cooperate with the semi-bearings carried by the levers to grip and surround either the journals of the rear wheels or the journals of the endless track bogies for supporting the rear portion of said chassis on either of said journals.

6. In a high speed vehicle adapted to be driven by ground wheels and endless tracks, a chassis, a pair of front steering and driving ground wheels, an oscillating suspended rear axle, an endless track on each side of the chassis, front and rear pulleys supporting said track, said pulleys being fixed against vertical movement, levers mounted on said rear axle having arms extending forwardly and rearwardly from said rear axle, journals mounted at the ends of said levers, rear ground-engaging wheels carried by the journals at one end of said levers, endless track-engaging roller bogies carried by the journals at the other end of said levers, and a shaft loosely carrying said rear pulleys and being mounted for sliding in a direction longitudinally of the chassis.

7. In a high speed vehicle adapted to be driven by ground wheels and endless tracks, a chassis, a pair of front steering and driving ground wheels, an oscillating suspended rear axle, and endless track on each side of the chassis, front and rear pulleys supporting said track, said pulleys being fixed against vertical movement, levers mounted on said rear axle having arms extending forwardly and rearwardly from said rear axle, journals mounted at the ends of said levers, rear ground-engaging wheels carried by the journals at one end of said levers, endless track-engaging roller bogies carried by the journals at the other end of said levers, a shaft loosely carrying said rear pulleys and being mounted for sliding in a direction longitudinally of the chassis, crank arms on said rear axle, and links connecting said crank arms to the shaft of said rear pulleys for sliding said rear pulleys toward and away from the forward endless track pulleys.

8. In a high speed vehicle adapted to be driven by ground wheels and endless tracks, a chassis, a pair of front steering and driving ground wheels, an oscillating suspended rear axle, an endless track on each side of the chassis, front and rear pulleys supporting said track, said pulleys being fixed against vertical movement, levers mounted on said rear axle having arms extending forwardly and rearwardly from said rear axle, journals mounted at the ends of said levers, rear ground-engaging wheels carried by the journals at one end of said levers, endless track-engaging roller bogies carried by the journals at the other end of said levers, oscillating levers mounted on the chassis for supporting the rear endless track pulleys, and means for fixing said levers in adjusted positions to vary the tension of the endless tracks.

9. A high speed front wheel steered vehicle adapted to be driven by ground wheels and endless tracks, comprising a chassis, a pair of front steering and driving ground wheels always in steering and driving contact with the ground, an oscillating suspended rear axle, rear ground-engaging wheels carried by said rear axle, endless track-engaging roller bogies carried by said rear axle, means for shifting said endless tracks into driving engagement with the ground, and means for transmitting driving motion to the endless tracks when they are in driving engagement with the ground and to the front driving and steering wheels both when the endless track is in driving engagement with the ground and when it is out of driving engagement with the ground.

10. A high speed front wheel steered vehicle adapted to be driven by ground wheels and endless tracks, comprising a chassis, a pair of front steering and driving ground wheels always in steering and driving contact with the ground, an oscillating suspended rear axle, levers mounted on said rear axle having arms extending forwardly and rearwardly from said rear axle, journals mounted at the ends of said levers, rear ground-engaging wheels carried by the journals at one end of said levers, endless track-engaging roller bogies carried by the journals at the other end of said levers, means for shifting said endless tracks into driving engagement with the ground, and means for transmitting driving motion to the endless tracks when they are in driving engagement with the ground and to the front driving and steering wheels both when the endless track is in driving engagement with the ground and when it is out of driving engagement with the ground.

ADOLPHE KÉGRESSE.